United States Patent

[11] 3,587,537

[72] Inventors Romas B. Spokas;
 Grant H. Smith, Rockford, Ill.
[21] Appl. No. 821,198
[22] Filed May 2, 1969
[45] Patented June 28, 1971
[73] Assignee Borg-Warner Corporation
 Chicago, Ill.

[54] TEMPERATURE MODULATED VARIABLE SPEED DRIVE
 2 Claims, 3 Drawing Figs.
[52] U.S. Cl. ............................................. 123/41.12,
 192/70.12, 192/82
[51] Int. Cl. ........................................... F01p 7/02,
 F01p 7/12
[50] Field of Search ........................................... 123/41.12;
 192/70.12, 82; 236/35, 87; 230/271, 270; 416/32,
 39

[56] References Cited
 UNITED STATES PATENTS
2,879,872 3/1959 Van Ranst .................... 192/70.12X
3,149,465 9/1964 Esbaugh ....................... (236/35UX)
3,207,379 9/1965 Ahlen ........................... (192/TO)
3,366,210 1/1968 Webster ....................... 192/70.12X Primary Examiner—Mark M. Newman
Assistant Examiner—Cort Flint
Attorneys—Donald W. Banner, William S. Mc Curry and John W. Butcher ABSTRACT: A variable speed accessory drive for a motor vehicle employs a wet-type friction clutch having friction discs disposed in a lubricating circuit for promoting slipping of the clutch. The clutch is urged toward driving engagement by a thermally extensible temperature sensor in series with a spring. The unit may be employed to drive a cooling fan at a speed proportional to the temperature of the engine coolant.

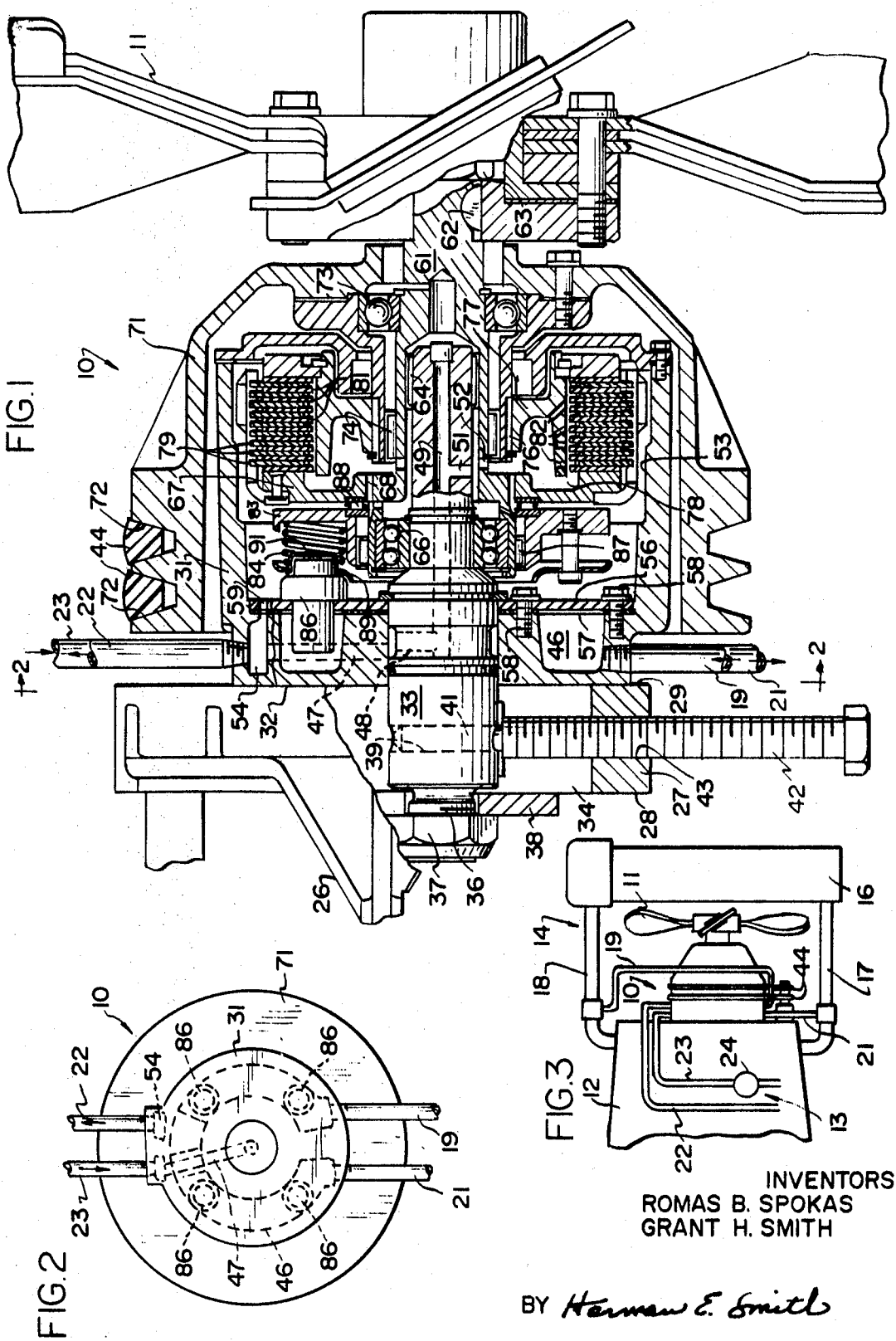

TEMPERATURE MODULATED VARIABLE SPEED DRIVE

SUMMARY OF THE INVENTION

The present invention relates generally to a variable speed drive and more particularly to such a drive having a friction clutch in which slippage is regulated in accordance with temperature.

Thermally actuated off or on type friction clutches have been employed in the past for controlling the engagement of the cooling fan for internal combustion engines. These prior devices have, however, created problems particularly when employed on heavy duty trucks and off-the-road machinery in that thermal shock and power surges are experienced in the engine as the fan is engaged and disengaged. An object of the present invention is to provide a stepless variable speed fan drive in which the rotational speed of the fan is varied in accordance with the temperature of the engine cooling medium, thus avoiding thermal shock and power surges. Other objects and advantages of the invention will become apparent from consideration of the following description together with the drawings.

BRIEF DESCRIPTION OF THE DRAWING

FIG. 1 is an elevation view in section showing a variable speed drive according to the present invention;

FIG. 2 is an end view to smaller scale looking in the direction of the arrows 2–2 of FIG. 1; and FIG. 3 is a fragmentary schematic environmental view showing the variable speed drive of the present invention in relation to an internal combustion engine.

DESCRIPTION OF THE PREFERRED EMBODIMENT

Referring now in greater detail to the drawing, the reference character 10 indicates variable speed accessory drive apparatus according to the present invention. As shown, drive apparatus 10 may be employed for driving a cooling fan 11 of an internal combustion engine 12 having a cooling medium circuit 14, and having a pressure lubricating system 13 associated therewith.

Cooling medium circuit 14 may include a heat exchanger 16 and suitable conduits 17, 18, 19, 21 for circulating a cooling medium through engine 12. A water pump not shown in the drawing may be employed for circulating coolant through cooling circuit 14.

Lubricating system 13 is indicated schematically by pump 24 for circulating lubricant through conduits 22, and 23.

Referring now to FIG. 1, the variable speed drive apparatus 10 is shown in greater detail. A mounting bracket 26 is secured to engine 12 and includes a guide portion 27 having opposed faces 28, 29. A nonrotatable housing 31 has a face 32 slidably engaging the face 29 of mounting bracket 26, and includes a studlike shaft 33 extending therefrom through aperture 34 in guide portion 27. Shaft 33 includes a threaded portion 36 extending through a plate 38 for receiving a nut 37. Plate 38 and face 32 of housing 31 embrace guide portion 27 for guiding the movement of drive apparatus 10. Shaft 33 includes an aperture 39 for receiving an end portion 41 of adjusting screw 42. Guide portion 27 includes a threaded aperture 43 engaged with adjusting screw 42. Thus rotation of screw 42 is effective to adjust the position of drive apparatus 10 with respect to mounting bracket 26 and engine 12, for adjusting the tension of drive belts 44.

Nonrotatable housing 31 includes a first series of interconnected passages and chambers communicating with the lubricant conduits 22, 23, and a second passage 46 communicating with coolant conduits 19, 21. The system of lubricating passages and chambers include passages 47, 48, 49, 51, 52 and the chambers 53, and 54. Lubricant introduced through conduit 23 flows through passages 47 through 52 into the chamber 53 and exits through chamber 54 to conduit 22. Chamber 53 is sealed against communication with coolant passage 46 by means of plate 56 and gasket 57 secured by cap screws 58. Notches in plate 56 and gasket 57, as indicated at 59, allow the return of cooling oil to conduit 22.

A rotatable output member 61 has fan 11 secured to an extended end portion thereof by means of a key 62 and nut 63. An inner end portion of output member 61 is journaled for rotation on shaft 33 by means of needle bearing 64 and ball bearing 66. An outer clutch member 67 has a spline connection 68 with output member 61.

Rotatable input member 71 includes V-belt grooves 72, 72 for receiving V-belts 44, 44 and is journaled for rotation on output member 61 by means of ball bearing 73 and needle bearing 74. Input member 61 has a spline connection 76 with an inner clutch member 77. A pack of wet-type friction disc clutch elements 79, 81 are connected with outer and inner clutch members 67, 77 and arranged to receive an axial clamping force for increasing the frictional engagement of the clutch discs with each other. Outer clutch member 67 and inner clutch member 77 form an enclosed lubricant chamber 78 between the passage 52 and chamber 53. Lubricant under pressure flows through the apertures 82 and outwardly between the clutch discs to chamber 53 thus lubricating and cooling the clutch discs as slippage occurs between outer and inner clutch members 67, 77.

Actuating means for applying a variable clamping force to clutch discs 79, 81 includes the pressure plate 83, the resilient compression springs 84 and the temperature sensing devices 86. Pressure plate 83 is mounted for axial movement on output member 61 by means of a needle bearing 87 and bears against clutch outer member 67 by means of thrust bearing 88. Thus axial movement of pressure plate 83 is effective to increase or relieve the clamping force exerted on clutch discs 79, 81.

Compression spring 84 is mounted between pressure plate 83 and thrust collar 89. The temperature sensing device 86 has an extensible portion 91 engaging thrust collar 89. Temperature sensor 86 is mounted in plate 56 and extends into the coolant passage 46 for sensing the temperature of the coolant. The slipping drive connection provided by clutch discs 79, 81 is transmitted to fan 11 by means of clutch outer member 67, spline connection 68, output member 61 and key 62. Extensible portion 91 is in the form of a plunger which is forced outwardly as temperature increases and retracts as temperature decreases.

Thus as the temperature of the coolant increases, the extensible plunger 91 extends outwardly compressing the resilient spring 84. The spring then exerts a force on pressure plate 83 which is a function of the coolant temperature. This force is transmitted to the outer clutch member 67 for exerting a clamping force on clutch discs 79, 81. In its preferred form, temperature sensor 86 is a well known type of thermal actuator which generally includes a thermally expansive fill material cooperating with an elastic boot for controlling extension of a plunger in accordance with temperature. The number of clutch discs 79, 81 and the number of sensor and spring assemblies 86, 84 required for a particular drive assembly 10 depends upon the maximum horsepower to be delivered to fan 11. In FIG. 2 four sensors 86 are shown arranged in coolant passage 46.

The present variable speed drive apparatus may be more fully understood through consideration of an operating sequence. Assume that the engine is started with the coolant at ambient temperature. Under this condition, the input drive member 71 is rotated by V-belts 44, 44, the sensor plunger 91 remains retracted, and lubricant flows through apertures 82 causing the clutch discs 79, 81 to slip on each other such that no driving force is transmitted to fan 11. As the engine continues to run, the temperature of the coolant increases causing extension of plunger 91 and providing a clamping force proportional to temperature. This clamping force opposes slippage of clutch discs 79, 81 resulting in slow rotation of fan 11. As the temperature of the coolant gradually increases with engine operation, the speed of fan 11 is gradually increased accordingly. During sustained engine operation, the temperature of the coolant varies as a function of engine loading and the speed of fan rotation varies according to coolant temperature. The lubricant flow across the clutch discs together with clamping force proportional to temperature thus provide stepless variable speed ratios between the input and output members.

While a preferred embodiment of the invention has been shown and described in the foregoing description and drawing, it is to be understood that modifications and alternate constructions thereof remain within the spirit of the invention and scope of the following claims.

We claim:

1. A temperature modulated variable speed accessory drive for an internal combustion engine having a pressure lubricating system and a cooling medium circuit operatively associated therewith, said variable speed drive including a nonrotatable housing, a rotatable input member, a rotatable output member, and wet-type slippable friction disc clutch elements connected to said rotatable members, said nonrotatable housing having first and second substantially annular passage means defined therein disposed axially adjacent each other, said first passage means being adapted for connection to said lubricating system and said second passage means being adapted for connection to said cooling medium circuit, said friction disc clutch elements being disposed within said first passage means and arranged for clamping frictional engagement with each other providing a slippable drive connection between said rotatable input member and said rotatable output member, and thermally responsive actuating means disposed within said housing including a temperature sensing device having a temperature sensing portion disposed within said second passage means for sensing the temperature therein and having an extensible portion disposed in said first passage means extensible in accordance with the temperature in said second passage means, said extensible portion engaging a spring member arranged and disposed for imposing a clamping force upon said friction disc clutch elements proportional to the temperature of said second passage means, whereby said friction disc clutch elements provide a slipping drive connection between said input and output members in which the speed of said output member varies with respect to the speed of said input member as a function of the temperature in said second passage means.

2. A temperature modulated variable speed accessory drive according to claim 1, in which said nonrotatable housing includes an axially extending support member, said output member being journaled for rotation on said support member, and said input member being coaxially journaled on said output member for rotation with respect thereto.